United States Patent
Kuru et al.

(10) Patent No.: US 10,437,263 B2
(45) Date of Patent: Oct. 8, 2019

(54) TOILET FILL VALVE WITH IMPROVED NOISE PERFORMANCE

(71) Applicant: Kohler Co., Kohler, WI (US)

(72) Inventors: William C. Kuru, Plymouth, WI (US); William Kalk, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/453,459

(22) Filed: Mar. 8, 2017

(65) Prior Publication Data

US 2017/0269614 A1  Sep. 21, 2017

Related U.S. Application Data

(60) Provisional application No. 62/310,418, filed on Mar. 18, 2016.

(51) Int. Cl.
| | | |
|---|---|---|
| *E03D 1/32* | (2006.01) | |
| *G05D 7/01* | (2006.01) | |
| *F16K 47/04* | (2006.01) | |
| *F15D 1/02* | (2006.01) | |
| *F16K 31/28* | (2006.01) | |

(52) U.S. Cl.
CPC ............. *G05D 7/0153* (2013.01); *E03D 1/32* (2013.01); *F15D 1/025* (2013.01); *F16K 47/04* (2013.01); *G05D 7/0146* (2013.01); *F16K 31/28* (2013.01)

(58) Field of Classification Search
CPC ...... G05D 7/0146; G05D 7/0153; E03D 1/32; F16K 31/18; F16K 31/20; F16K 31/28; F16K 47/04; F15D 1/02; F15D 1/025

USPC .......................................... 138/42, 43, 44, 46
See application file for complete search history.

(56) References Cited

U.S. PATENT DOCUMENTS

| | | | | |
|---|---|---|---|---|
| 6,510,866 B2* | 1/2003 | Li | ............................. | E03D 1/32 |
| | | | | 137/2 |
| 8,567,445 B2* | 10/2013 | Schwartz | ................ | E03C 1/021 |
| | | | | 137/385 |
| 2007/0102053 A1* | 5/2007 | Le | ............................. | F15D 1/02 |
| | | | | 138/43 |
| 2015/0308591 A1* | 10/2015 | Davino | .................... | E03C 1/025 |
| | | | | 285/92 |
| 2016/0032577 A1* | 2/2016 | Guthrie | ................... | E03D 11/13 |
| | | | | 251/321 |

FOREIGN PATENT DOCUMENTS

| | | |
|---|---|---|
| CN | 200968470 | 10/2007 |
| CN | 103851604 | 6/2014 |
| CN | 204254136 | 4/2015 |
| CN | 104956007 | 9/2015 |
| CN | 105003763 | 10/2015 |

* cited by examiner

*Primary Examiner* — Ian G Paquette
(74) *Attorney, Agent, or Firm* — Foley & Lardner LLP

(57) ABSTRACT

A fill valve for receiving a fluid flow includes a lower pipe and a flow restrictor cartridge. The flow restrictor cartridge is received in the lower pipe. The flow restrictor cartridge receives the fluid flow at a first fluid flow rate and provides the fluid flow as a second fluid flow rate lower than the first fluid flow rate. The flow restrictor cartridge includes a receiver and a compact flow restrictor. The compact flow restrictor is received by the receiver. The compact flow restrictor is configured to facilitate the reduction from the first fluid flow rate to the second fluid flow rate.

20 Claims, 18 Drawing Sheets

TOILET FILL VALVE WITH IMPROVED NOISE PERFORMANCE

CROSS-REFERENCE TO RELATED APPLICATION

The present application claims the benefit of, and priority to, U.S. Provisional Patent Application No. 62/310,418, which was filed on Mar. 18, 2016, the entirety of which is incorporated by reference herein.

BACKGROUND

The present application relates generally to fill valves and flow restrictors. In particular, this application relates to a flow restrictor cartridge for installing a number of compact flow restrictors in a fill valve.

Generally speaking, fill valves are used to input fluid into a device (e.g., toilet, shower head, faucet, bathtub, spa, pool, spray handle, steam generator, etc.). Fill valves often include flow restrictors to decrease flow rate from a source (e.g., water supply, well, pipe, etc.) such that a suitable flow rate can be utilized by the device. The flow rate output by the fill valve may be maintained by the flow restrictor. Various types of flow restrictors, such as compact flow restrictors, can be incorporated into a fill valve.

SUMMARY

One embodiment of the present disclosure is related to a fill valve for receiving a fluid flow. The fill valve includes a lower pipe and a flow restrictor cartridge. The flow restrictor cartridge is received in the lower pipe. The flow restrictor cartridge receives the fluid flow at a first fluid flow rate and provides the fluid flow at a second fluid flow rate lower than the first fluid flow rate. The flow restrictor cartridge includes a receiver and a compact flow restrictor. The compact flow restrictor is received by the receiver. The compact flow restrictor is configured to facilitate the reduction from the first fluid flow rate to the second fluid flow rate.

Another embodiment of the present disclosure is related to a flow restrictor cartridge for use within a fill valve. The flow restrictor cartridge includes a hollow cylindrical body, a receiver, a stop, and a compact flow restrictor. The hollow cylindrical body is received within a pipe of the fill valve. The hollow cylindrical body has a first end and an opposing second end. The hollow cylindrical body receives a flow of fluid at one of the first end and the second end from a fluid source. The hollow cylindrical body provides the flow of fluid from the other of the first end and the second end. The receiver is located within the hollow cylindrical body and extends to the first end. The stop defines a boundary of the receiver within the hollow cylindrical body. The stop is an annulus disposed along a plane that is parallel to the first end. The compact flow restrictor is configured to be received by the receiver. The compact flow restrictor is defined by a first flow rate reduction. The compact flow restrictor is configured to reduce a flow rate of the flow of fluid from a source flow rate to a target flow rate.

Yet another embodiment of the present disclosure is related to a fill valve for receiving a fluid flow. The fill valve includes a lower pipe and a plurality of flow restrictor cartridges. The plurality of flow restrictor cartridges are individually received in the lower pipe. Each of the plurality of flow restrictor cartridges receives the fluid flow from one of a fluid source and one of the others of the plurality of flow restrictor cartridges. Each of the plurality of flow restrictor cartridges provides the fluid flow to one of an outlet and one of the others of the plurality of flow restrictor cartridges. The plurality of flow restrictor cartridges is configured to cooperate to reduce a flow rate of the fluid flow from a source fluid flow rate to a target fluid flow rate.

It is to be understood that both the foregoing general description and the following detailed description are exemplary and explanatory only and are not restrictive of the invention as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
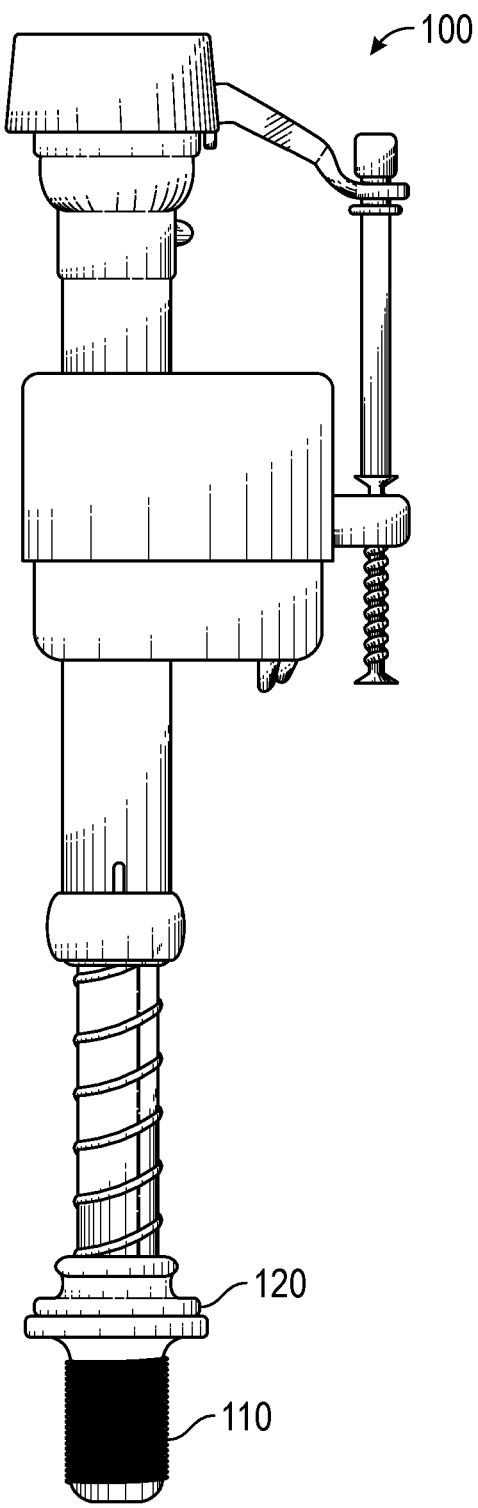
FIG. 1 is a side view of a fill valve.
Figure 2:
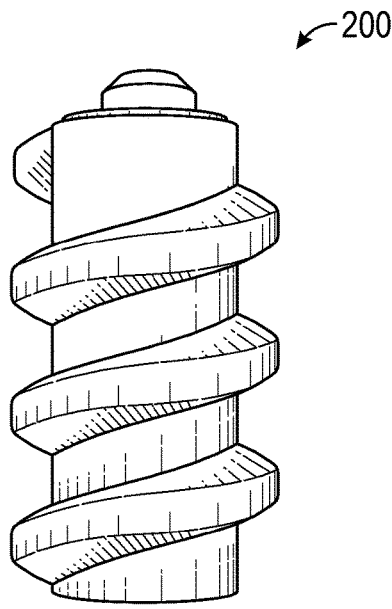
FIG. 2 is a side view of a conventional flow restrictor for use with a fill valve, such as the fill valve shown in FIG. 1.
Figure 3:
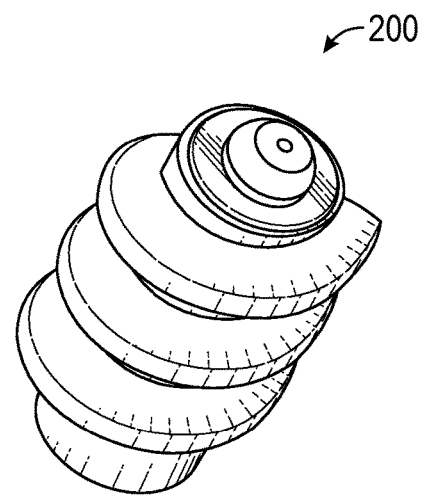
FIG. 3 is a perspective view of the conventional flow restrictor shown in FIG. 2.
Figure 4:
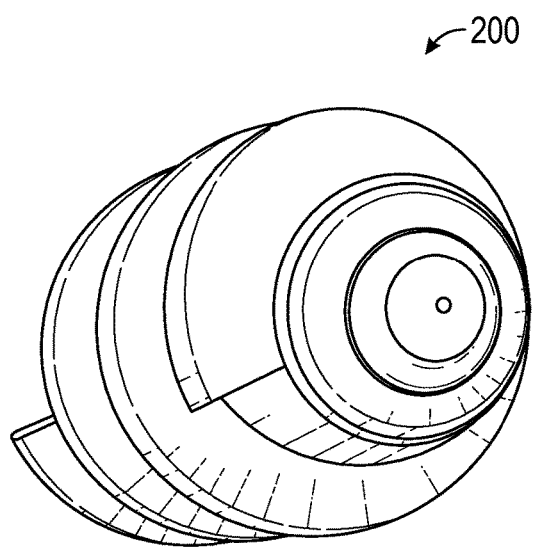
FIG. 4 is a top view of the conventional flow restrictor shown in FIG. 2.
Figure 5:
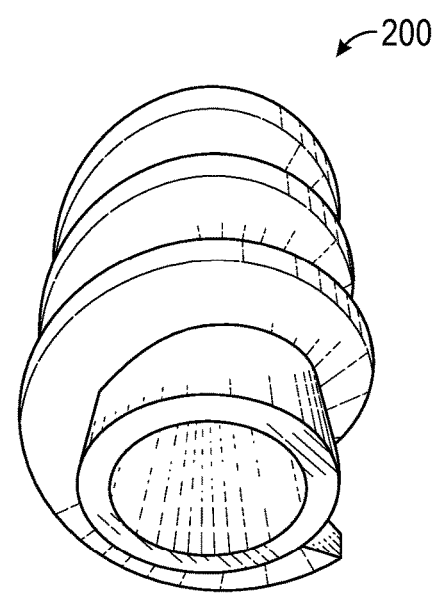
FIG. 5 is a bottom view of the conventional flow restrictor shown in FIG. 2.

Referring to FIG. 1, a valve, shown as fill valve 100, is shown. Fill valve 100 is used to control a flow of fluid (e.g., water, non-potable water, etc.) into a device (e.g., toilet, shower head, faucet, spray handle, steam generator, etc.). Fill valve 100 includes a pipe (e.g., conduit, connector, etc.), shown as lower pipe 110, and a flange (e.g., mounting flange, etc.), shown as flange 120. The performance of a fill valve, such as fill valve 100, may be determined based on a variety of metrics such as flow rate (e.g., volumetric flow rate, mass flow rate, etc.) and a refill noise (e.g., measured in decibels, etc.). The refill noise is an amount of audible sound produced by the fill valve while the device (e.g., a toilet tank) is refilling (i.e., being filled with a fluid). Fill valves that have a high refill noise are less desirable in many applications. For example, it is undesirable to have a toilet that includes a fill valve with a high refill noise. According to various embodiments, fill valve 100 is a commercially available off-the-shelf fill valve. In one embodiment, fill valve 100 is a FluidMaster® 400 fill valve. Fill valve 100 may include various seals, gaskets, tubes, mounting hardware, and adaptors for mounting on a device (e.g., toilet, shower head, faucet, spray handle, steam generator, etc.).

Referring now to FIGS. 2-5, a conventional flow restrictor for use in fill valves, shown as conventional flow restrictor 200, is shown. Conventional flow restrictor 200 may be installed in a fill valve. Conventional flow restrictor 200 is constructed from a flexible material (e.g., rubber). In many applications, conventional flow restrictor 200 is used to reduce the amount of fluid that overflows from a device if the fill valve continues to refill the device beyond a designed limit. In one example, conventional flow restrictor 200 reduces the amount of water that overflows onto a floor when a fill valve overflows a toilet. In some cases, the devices include a flush valve overflow. The flush valve overflow may be designed to remove excess fluid from the device. Many flush valve overflows cannot handle a flow rate into the device that is approximately 26.5 liters per minute (e.g., seven gallons per minute, etc.). Through the use of conventional flow restrictor 200, flow rate from the fill valve may be limited at a certain valve (e.g., 26.5 liters per minute, etc.). Additionally, conventional flow restrictor 200 may limit the flow rate from the fill valve at elevated pressures (e.g., greater than four-hundred and eighty-two kilopascals).

A secondary purpose of conventional flow restrictor 200 is to maintain a flow rate of the fill valve. During operation, the fill valve may encounter a varying flow rate into the fill valve. For example, a well (e.g., fluid source, etc.) that supplies water to a fill valve may supply a different flow rate depending on other loads on the well (e.g., a washing machine, etc.). Through this use of conventional flow restrictor 200, device performance (e.g., toilet performance, shower head performance, etc.) may be consistent for various water supplies and various flow rates into the fill valve. Through the use conventional flow restrictor 200, the device may have a safety factor of approximately 2.

Figure 6:
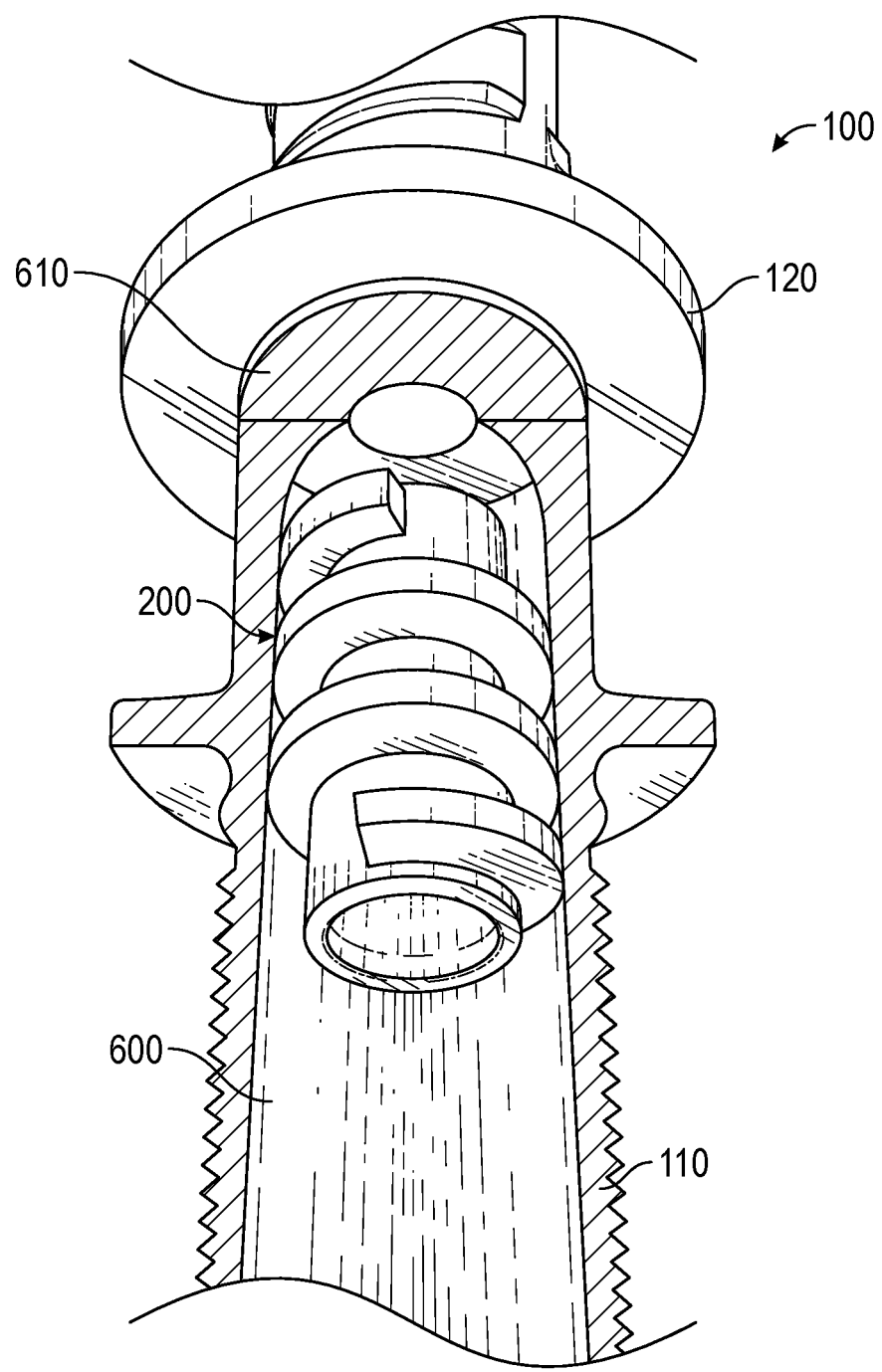
FIG. 6 is cross-sectional view of a fill valve including the conventional flow restrictor shown in FIG. 2.
Figure 7:
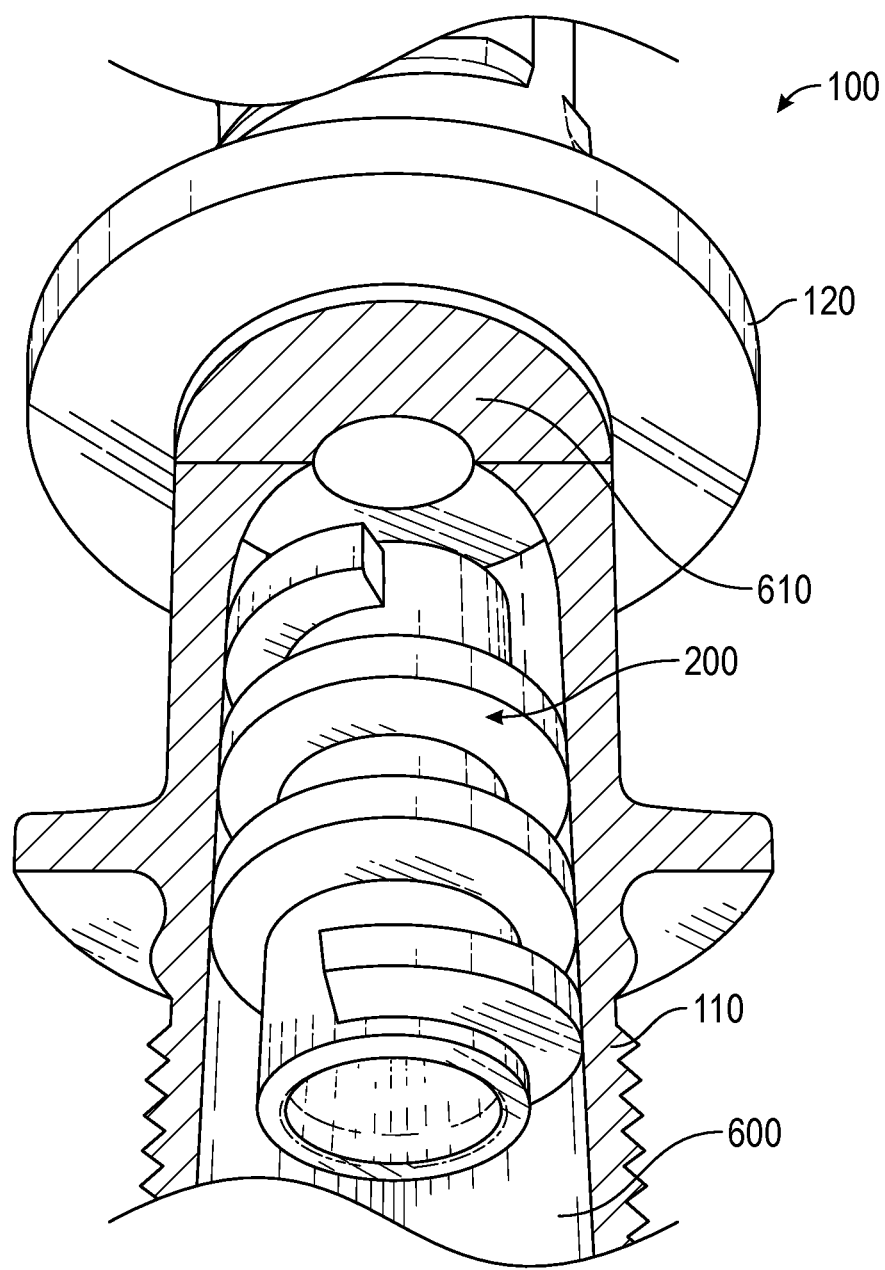
FIG. 7 is another cross-sectional view of a fill valve including the conventional flow restrictor shown in FIG. 2.

FIGS. 6 and 7 illustrate conventional flow restrictor 200 installed in lower pipe 110 of fill valve 100. As shown, a portion of lower pipe 110 has been removed such that interaction between conventional flow restrictor 200 and a region, shown as interior region 600, is visualized. Movement of conventional flow restrictor 200 is confined in one direction by a stop, shown as stop 610, that is positioned in confronting relation with flange 120. Stop 610 is configured to facilitate the passage of fluid while prohibiting the translation of conventional flow restrictor 200 in one direction. In operation, fluid flow (e.g., water flow) may bias conventional flow restrictor 200 against stop 610.

Figure 8:
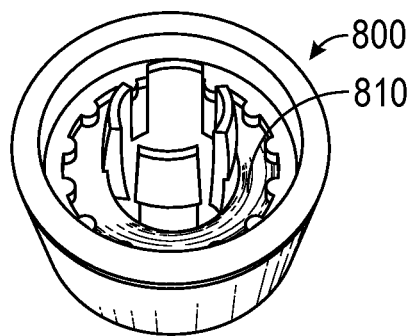
FIG. 8 is a top view of a compact flow restrictor.
Figure 9:
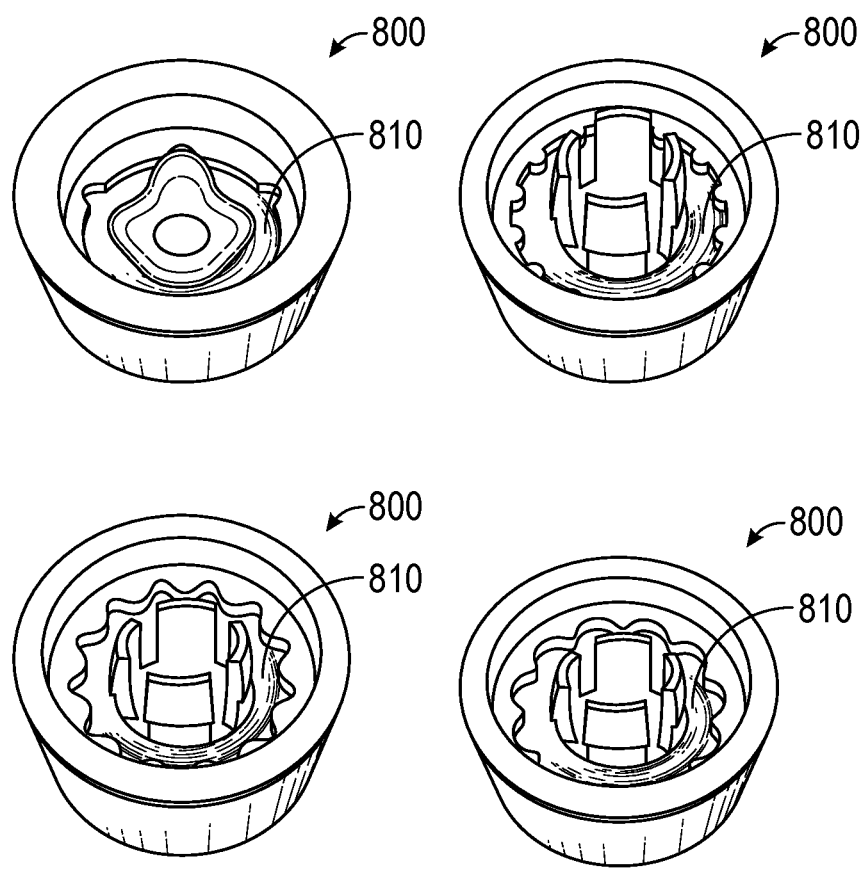
FIG. 9 is a top view of a number of compact flow restrictors.

Referring now to FIG. 8, a flow restrictor, shown as compact flow restrictor 800, is shown. According to various embodiments, compact flow restrictor 800 includes a seal, shown as O-ring 810. O-ring 810 is designed to control fluid flow through compact flow restrictor 800. In operation, O-ring 810 is compressed thereby reducing flow rate at elevated pressures. FIG. 9 illustrates a variety of different compact flow restrictors 800. Depending on the application (e.g., the device, flow rate, fill valve, etc.) different compact flow restrictors 800 may be desirable. Compact flow restrictors 800 may be defined by a flow rate. For example, compact flow restrictors 800 may have a flow rate of 4.731 liters per minute (e.g., 1.25 gallons per minute) or 5.678 liters per minute (e.g., 1.5 gallons per minute). Compact flow restrictors 800 may be commercially available off-the-shelf flow restrictors.

Figure 10:
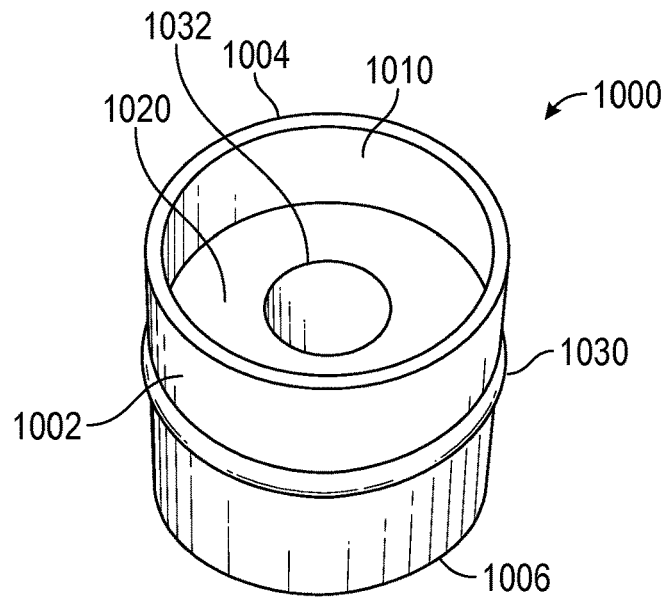
FIG. 10 is a perspective view of a flow restrictor cartridge for receiving a compact flow restrictor, such as the compact flow restrictors shown in FIGS. 8 and 9, according to an exemplary embodiment of the present disclosure.

As shown in FIG. 10, a cartridge, shown as flow restrictor cartridge 1000, is shown according to an exemplary embodiment. Flow restrictor cartridge 1000 is configured to facilitate a reduction (e.g., decrease, etc.) in the flow rate of a flow of fluid from a source flow rate (e.g., 26.5 liters per minute) to a target flow rate (e.g., 1.5 liters per minute, etc.). Flow restrictor cartridge 1000 includes a body (e.g., frame, etc.), shown as body 1002, a first end (e.g., face, etc.), shown as first end 1004, and a second end (e.g., face, etc.), shown as second end 1006. As shown in FIG. 10, body 1002 is a hollow cylinder. Flow restrictor cartridge 1000 also includes a region, shown as receiver 1010, a stop, shown as stop 1020, and a seal, shown as O-ring 1030. The receiver 1010 is located within body 1002 and extends into, and is contiguous with, first end 1004.

Figure 11:
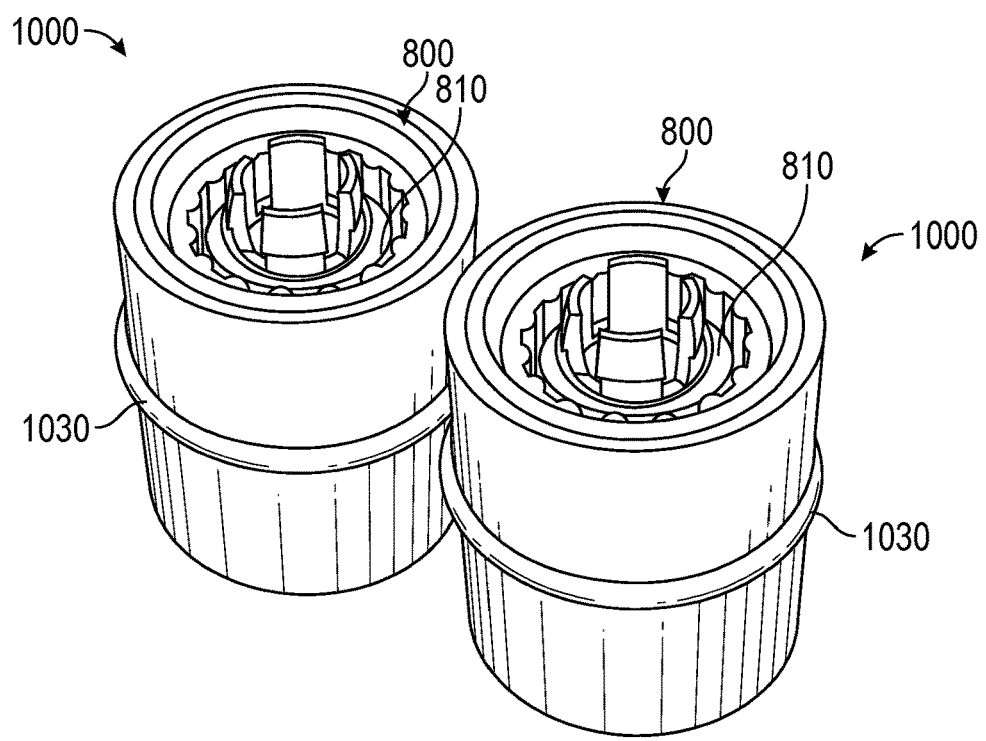
FIG. 11 is a perspective view of two compact flow restrictors, such as the compact flow restrictors shown in FIGS. 8 and 9, each installed in a flow restrictor cartridge, according to an exemplary embodiment of the present disclosure.

According to various embodiments, receiver 1010 is sized and configured to receive compact flow restrictor 800. In some embodiments receiver 1010 snuggly receives compact flow restrictor 800. FIG. 11 illustrates compact flow restrictor 800 installed in flow restrictor cartridge 1000. When installed in receiver 1010, compact flow restrictor 800 may be in confronting relation (e.g., in contact with, interface with, etc.) with stop 1020. In this way, stop 1020 defines an internal boundary of receiver 1010. According to various embodiments, stop 1020 is annulus shaped (e.g., ring shaped, etc.). For example, stop 1020 may be defined by a major diameter equal to the diameter of receiver 1010 and a minor diameter equal to a diameter of a passage, shown as central passage 1032, of body 1002. In application, the flow of fluid flows from the first end 1004 to the second end 1006 through the central passage 1032.

Flow restrictor cartridge 1000 is configured to be received within lower pipe 110. For example, the body 1002 may have a diameter that is slightly less (e.g., to facilitate movement of flow restrictor cartridge 1000 within lower pipe 110, etc.) than a diameter of lower pipe 110. O-ring 1030 may provide a sealing mechanism between flow restrictor cartridge 1000 and interior region 600 such that fluid is substantially prevented from circumventing flow restrictor cartridge 1000.

According to various embodiments, receiver 1010 is configured to receive one compact flow restrictor 800. However, in alternative embodiments, receiver 1010 may receive two or more compact flow restrictors 800 (e.g., in series, etc.). Further, in some embodiments, flow restrictor cartridge 1000 includes multiple receivers 1010 (e.g., one receiver 1010 that is contiguous with first end 1004 and one receiver 1010 that is contiguous with second end 1006, etc.) each receiving a number of compact flow restrictors 800. Similarly, flow restrictor cartridge 1000 may include multiple stops 1020 or O-rings 1030. In some applications, flow restrictor cartridge 1000 may include one receiver 1010 (e.g., contiguous with first end 1004, etc.) configured to receive a first compact flow restrictor 800 and a second receiver 1010 (e.g., contiguous with second end 1006, etc.) configured to receive a second compact flow restrictor 800 different from the first compact flow restrictor 800. Receivers 1010, stops 1020, and O-rings 1030 may all be of various dimensions such that flow restrictor cartridge 1000 is tailored for a target application.

Alternatively, compact flow restrictor 800 may be configured to be received in flow restrictor cartridge 1000 without the use of stop 1020. For example, compact flow restrictor 800 may have a recessed region configured to be received in receiver 1010 and a non-recessed region configured to interface with an edge of flow restrictor cartridge 1000.

Figure 12:
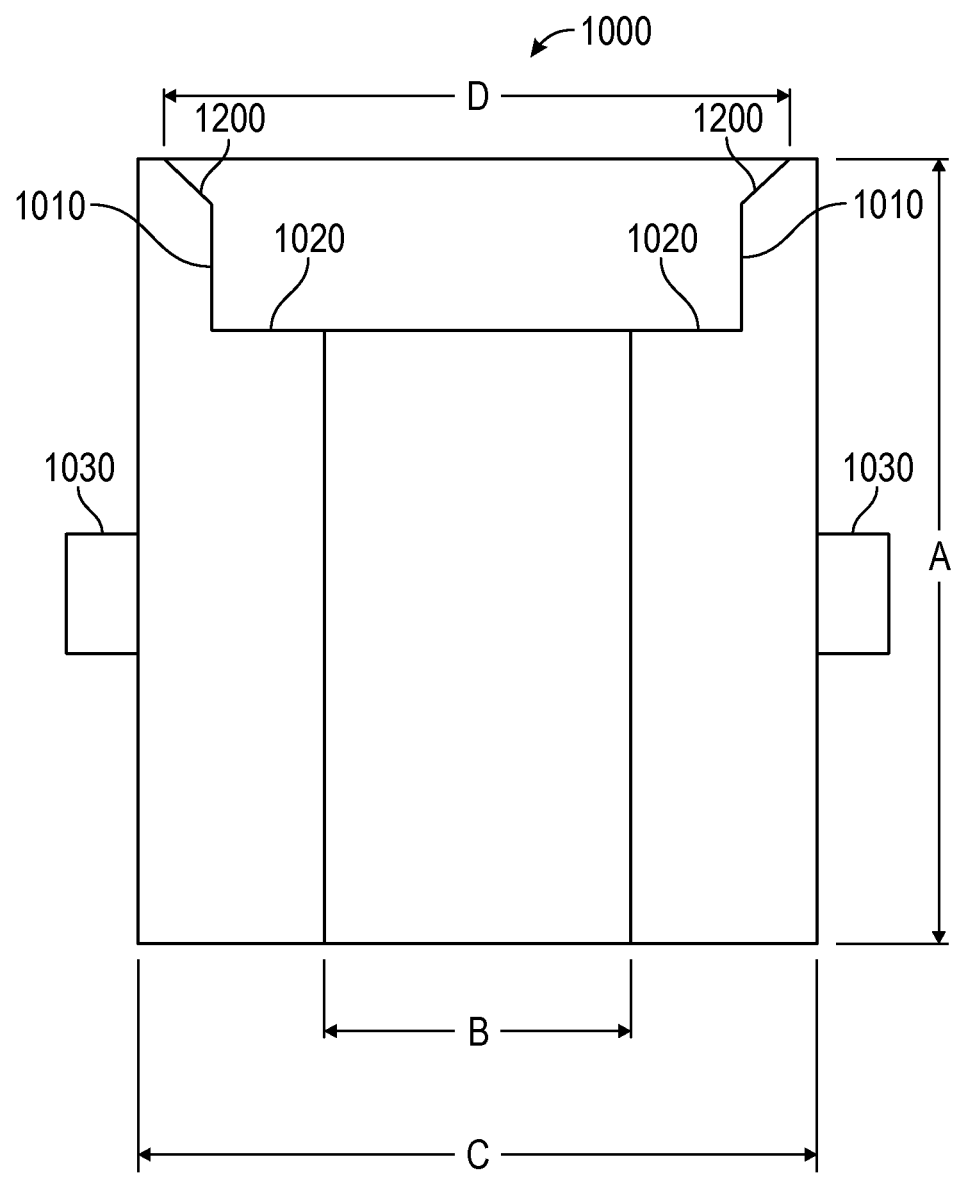
FIG. 12 is a cross-sectional view of the flow restrictor cartridge shown in FIG. 11.

Referring now to FIG. 12, a cross-sectional view of flow restrictor cartridge 1000 including compact flow restrictor 800 is shown. As shown in FIG. 12, flow restrictor cartridge 1000 may be defined by a dimension "A," a dimension "B," and a dimension "C." Dimension "A" is an overall length of flow restrictor cartridge 1000. For example, dimension "A" may be equal to 1.905 centimeters (e.g., 0.75 inches, etc.). For reference, an overall length of conventional flow restrictor 200 may be 2.972 centimeters (e.g., 1.17 inches, etc.). Dimension "B" is an inner diameter of flow restrictor cartridge 1000. For example, dimension "B" may be equal to 1.232 centimeters (e.g., 0.485 inches, etc.). Dimension "C" is an outer diameter of flow restrictor cartridge 1000. For example, dimension "C" may be equal to 1.676 centimeters (e.g., 0.66 inches, etc.). Receiver 1010 may include an edge, shown as beveled edge 1200, on each of first end 1004 and second end 1006. In these embodiments, beveled edge 1200 is contiguous with first end 1004 and/or second end 1006. Beveled edge 1200 may be defined by an angle "D" relative to stop 1020. For example, angle "D" may be forty-five degrees. Beveled edge 1200 may provide a sealing edge between flow restrictor cartridge 1000 and compact flow restrictor 800. It is understood that dimensions "A," "B," "C," and angle "D" may be varied such that flow restrictor cartridge 1000 and fill valve 100 are tailored for a target application.

Figure 13:
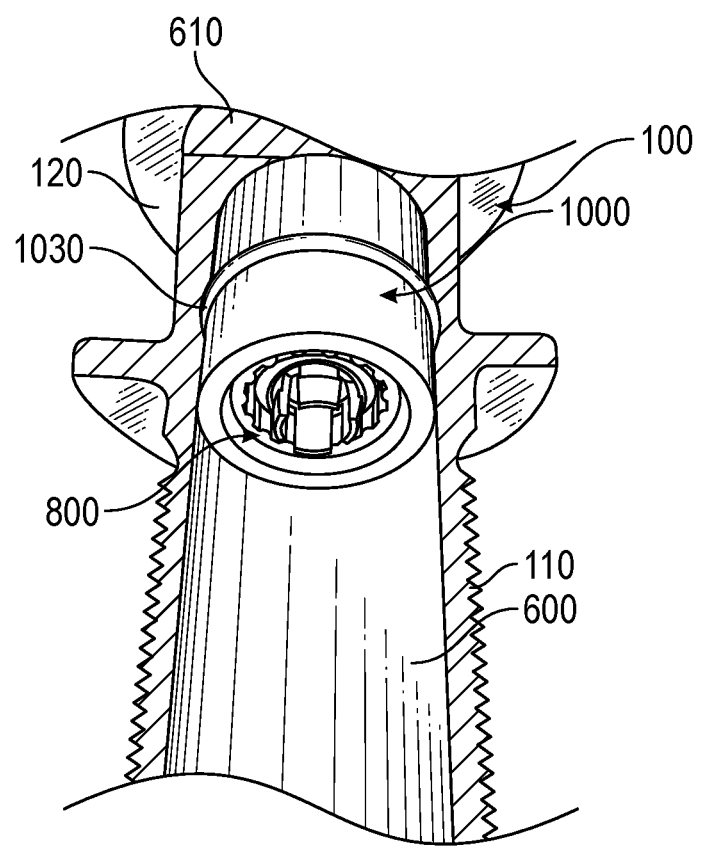
FIG. 13 is a cross-sectional view of a fill valve including a flow restrictor cartridge having an installed compact flow restrictor, such as the compact flow restrictors shown in FIGS. 8 and 9, according to an exemplary embodiment of the present disclosure.

FIG. 13 illustrates flow restrictor cartridge 1000 installed in lower pipe 110. Similar to conventional flow restrictor 200, flow restrictor cartridge 1000 is prohibited from moving in one direction by stop 610. Flow restrictor cartridge 1000 may be configured such that a length of flow restrictor cartridge 1000 corresponds to a desired distance between compact flow restrictors 800 when two flow restrictor cartridges 1000 are installed in lower pipe 110 in series, each having one compact flow restrictor 800. According to various embodiments, flow restrictor cartridge 1000 is installed such that the portion of flow restrictor cartridge 1000 not including compact flow restrictor 800 is in confronting relation with stop 610. In operation, fluid (e.g., water) flows through lower pipe 110, through compact flow restrictor 800, through the rest of flow restrictor cartridge 1000, and through stop 610. This flow of fluid may bias flow restrictor cartridge 1000 against stop 610. Alternatively, flow restrictor cartridges 1000 may be sized such that they are snuggly received in lower pipe 110. In other applications, flow restrictor cartridges 1000 may be movable within lower pipe 110. It is understood that while flow restrictor cartridge 1000 is shown and described as being installed in lower pipe 110, flow restrictor cartridge 1000 may similarly be installed at other locations within fill valve 100 such that fill valve 100 is tailored for a target application.

In some embodiments, flow restrictor cartridges 1000 are positioned a distance away from stop 610. For example, in one embodiment, flow restrictor cartridge 1000 is located up to 6.03 centimeters (e.g., 2.37 inches, etc.) away from stop 610. However, in other applications other distances may be possible and/or desirable. According to this embodiment, flow restrictor cartridge 1000 is maintained in a positioned through an interface between flow restrictor cartridge 1000 and interior region 600.

Figure 14:
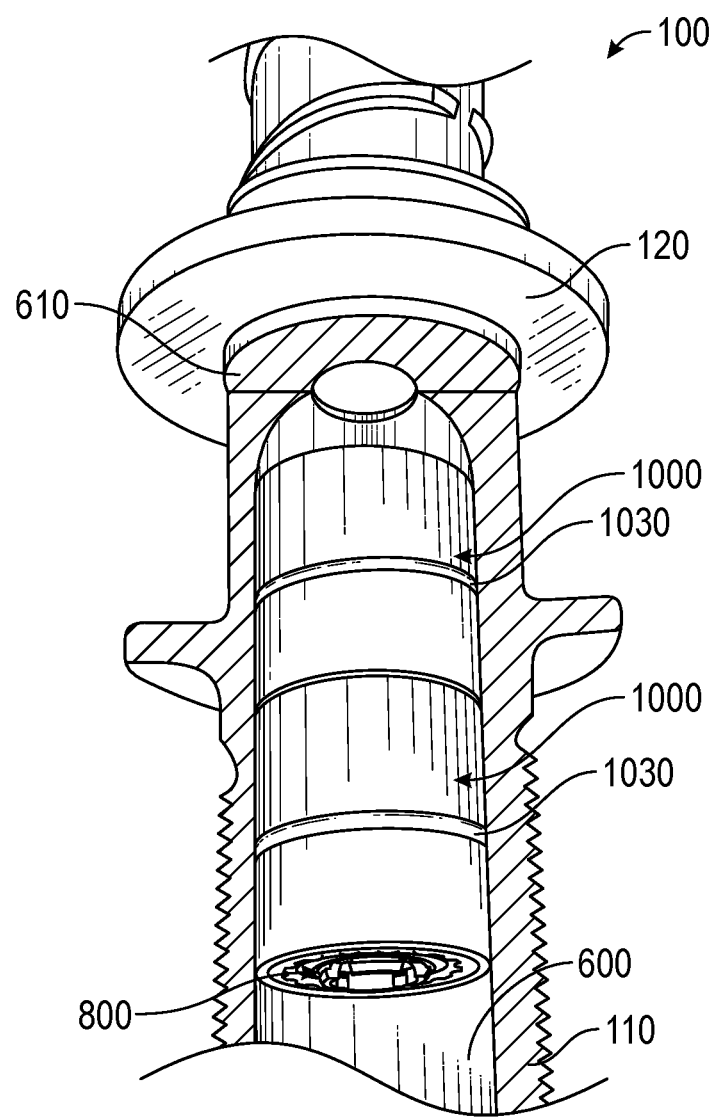
FIG. 14 is a cross sectional view of a fill valve including two flow restrictor cartridges in series, each having an installed compact flow restrictor, such as the compact flow restrictors shown in FIGS. 8 and 9, according to an exemplary embodiment of the present disclosure.
Figure 15:
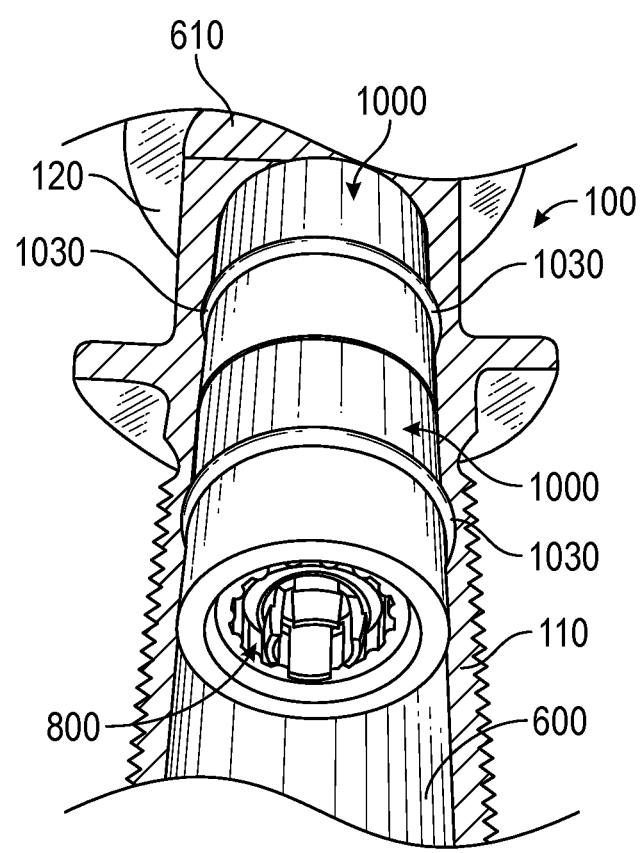
FIG. 15 is another cross sectional view of the fill valve including two flow restrictor cartridges shown in FIG. 12.

In some applications, two or more flow restrictor cartridges 1000 may be installed in series in lower pipe 110. Referring to FIGS. 14 and 15, two flow restrictor cartridges 1000 are installed in series in lower pipe 110. For example, a first flow restrictor cartridge 1000 may contain a first compact flow restrictor 800 and a second flow restrictor cartridge 1000 may contain a second compact flow restrictor 800 different from the first compact flow restrictor 800. In this way, different effects on flow rate can be obtained. For example, a first compact flow restrictor 800 with a high flow rate, meaning that is has less of an effect on fluid flow (e.g., produces less of a decrease, etc.), may encounter a fluid flow prior to a second compact flow restrictor 800 with a lower flow rate (e.g., producing more of a decrease, etc.) than the first compact flow restrictor 800, thereby gradually stepping down the flow rate of the fluid across multiple compact flow restrictors 800. In this way, useful life and/or efficiency of the compact flow restrictors 800 and/or flow restrictor cartridges 1000 may be increased. This effect may also reduce the refill noise of fill valve 100. In another example, a first compact flow restrictor 800 with a low flow rate, meaning that is has greater effect on fluid flow (e.g., producing more of a decrease, etc.), may encounter a fluid flow prior to a second compact flow restrictor 800 with a higher flow rate (e.g., producing less of a decrease, etc.) than the first compact flow restrictor 800, thereby changing the flow rate of the fluid across multiple compact flow restrictors 800.

In some applications, more than two flow restrictor cartridges 1000 may be installed in lower pipe 110. For example, a fill valve 100 may contain three, four, five, or more flow restrictor cartridges 1000 in series. Further, flow restrictor cartridges 1000 in series may be separated by a target spacing. The target spacing may be chosen such that a desired distance between two compact flow restrictors 800 is achieved. In an embodiment with three or more flow restrictor cartridges 1000, a target spacing between a first flow restrictor cartridge 1000 and a second flow restrictor cartridge 1000 is different from or the same as a target spacing between a second flow restrictor cartridge 100 and a third flow restrictor cartridges 1000. In various embodiments, flow restrictor cartridges 1000 are located up to 6.03 centimeters (e.g., 2.375 inches) away from stop 610. However, in other applications, other distances may similarly be possible and/or desirable. In an embodiment with two or more flow restrictor cartridges 1000, an O-ring 1030 from a first flow restrictor cartridge 1000 does not come in contact with any surface of any other flow restrictor cartridge 1000.

Through the use of flow restrictor cartridge 1000, refill noise from fill valve 100 may be reduced compared to conventional flow restrictor 200. By using two or more flow restrictor cartridges 1000 in series, refill noise may be even further reduced. For example, by increasing the number of compact flow restrictors using in fill valve 100, the length by which energy is dissipated increases. The change in flow energy is calculated following the equation:

$$\Delta E = \frac{\Delta P}{\rho} \qquad (1)$$

Here, ΔE is the change in flow energy, ΔP is the change in pressure, and ρ is the fluid density. It follows that by increasing the length over which energy dissipation occurs that energy is dissipated at a slower rate. In other words, refill noise may be reduced by using two or more flow restrictor cartridges 1000 in series because the change in pressure is lower across each individual flow restrictor cartridge 1000. Similarly, when arranged flow restrictor cartridges 1000 are arranged in series, O-ring 810 may impede less fluid flow thereby reducing velocities, turbulence, and energy dissipation. Additionally, it is possible that an increase in cross-sectional area will result in a decrease of acoustical noise production from flow restrictor cartridge 1000. This increase in cross-sectional area may result from a difference in the cross-sectional area of compact flow restrictor 800 and the cross-sectional area of flow restrictor cartridge 1000.

Figure 16:
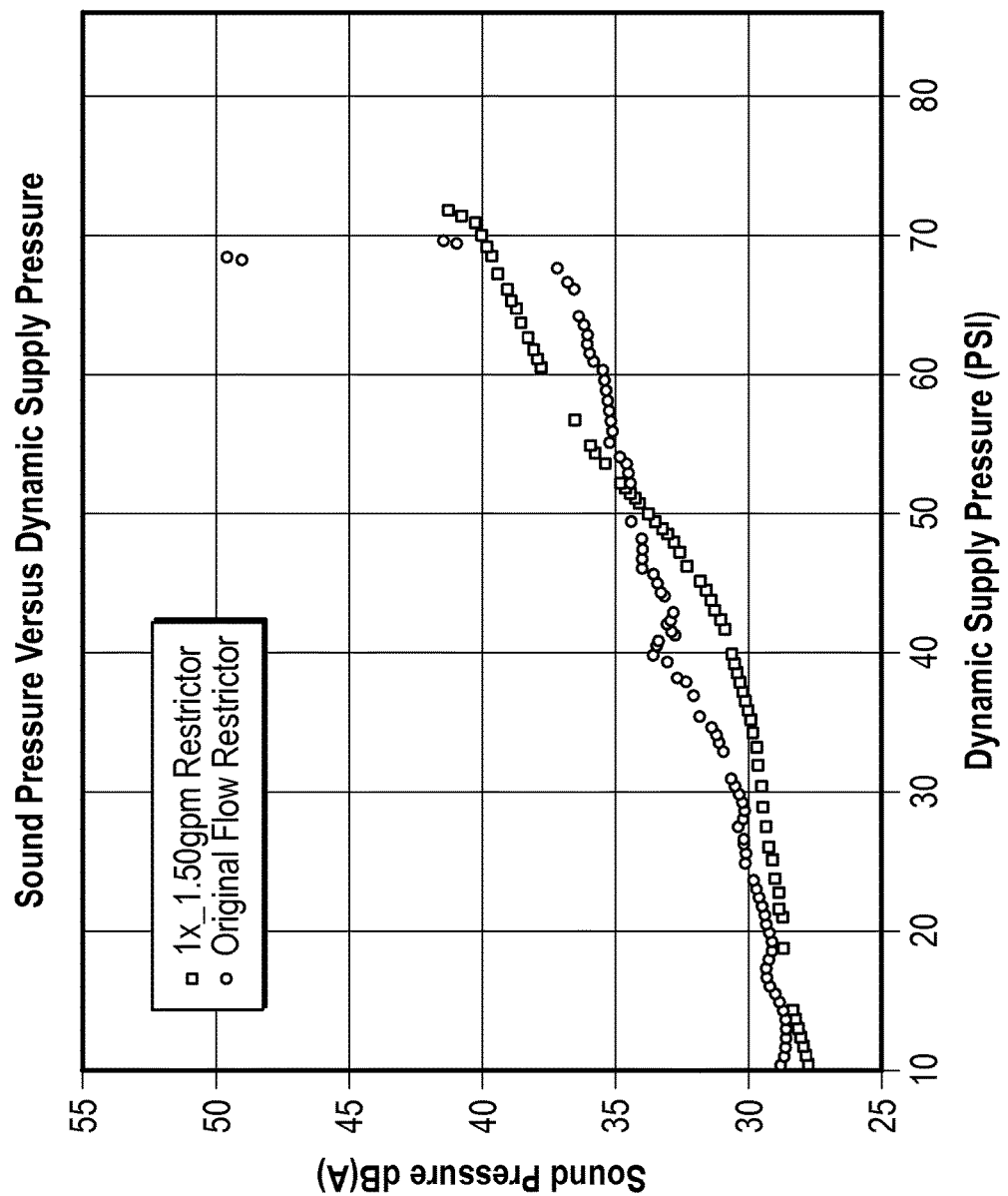
FIGS. 16-23 are a number of graphical representations of experimental data.
Figure 17:
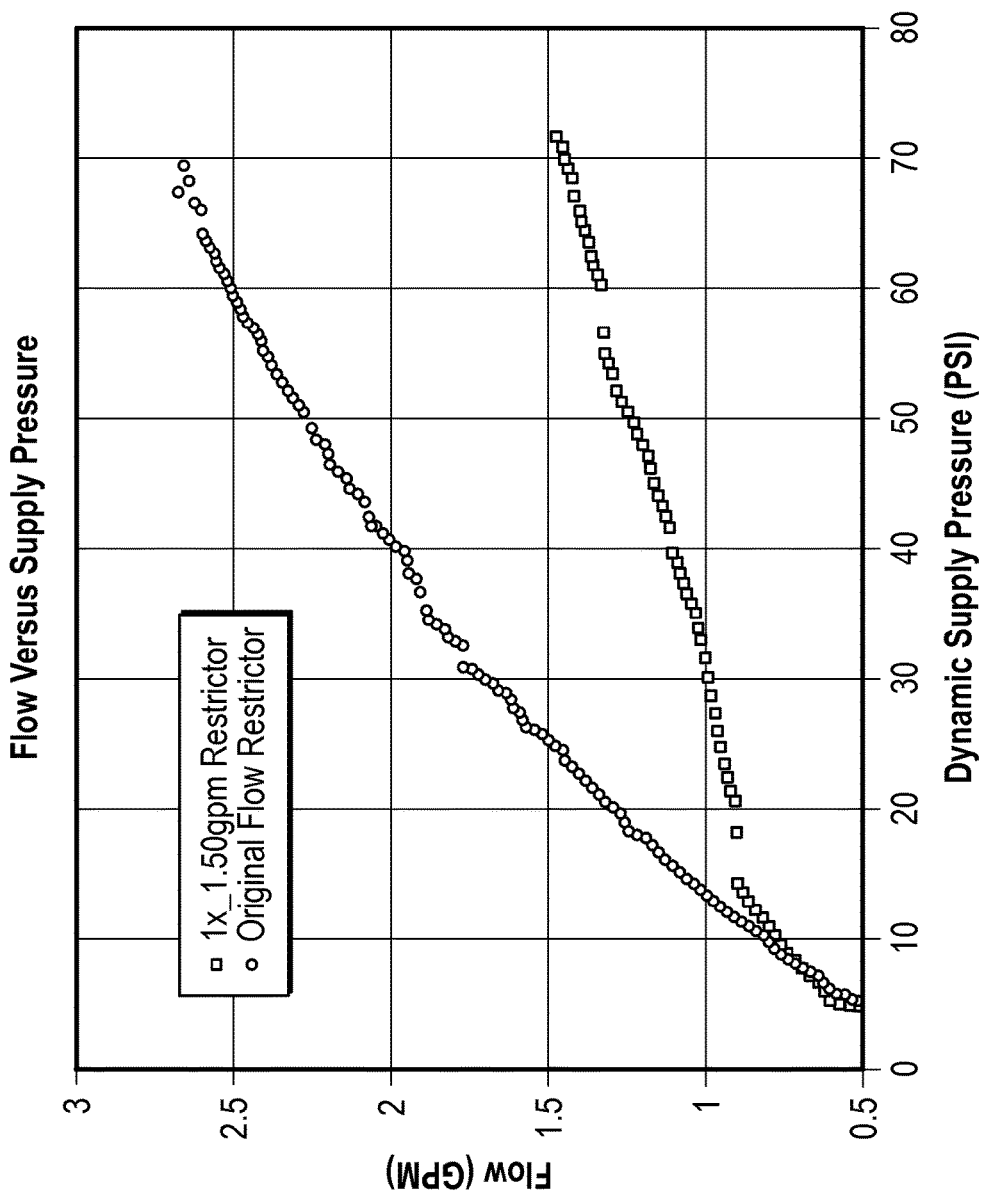

Referring now to FIGS. 16-23, various data comparisons of sound pressure verses dynamic supply pressure and flow versus supply pressure are shown. In experimenting and obtaining this data, all noise measurements were made with the splash and drop noise isolated. As shown in FIGS. 16 and 17, data is compared for a fill valve 100 having conventional flow restrictor 200 to a fill valve 100 having flow restrictor cartridge 1000 and a compact flow restrictor 800 with a flow rate of 5.678 liters per minute (e.g., 1.5 gallons per minute). At many dynamic supply pressures, fill valve 100 having flow restrictor cartridge 1000 produces a lower sound pressure than fill valve 100 having conventional flow restrictor 200. However, flow restrictor cartridge 1000 clearly facilitates a larger reduction of flow over a wide number of dynamic supply pressures compared to conventional flow restrictor 200.

Figure 18:
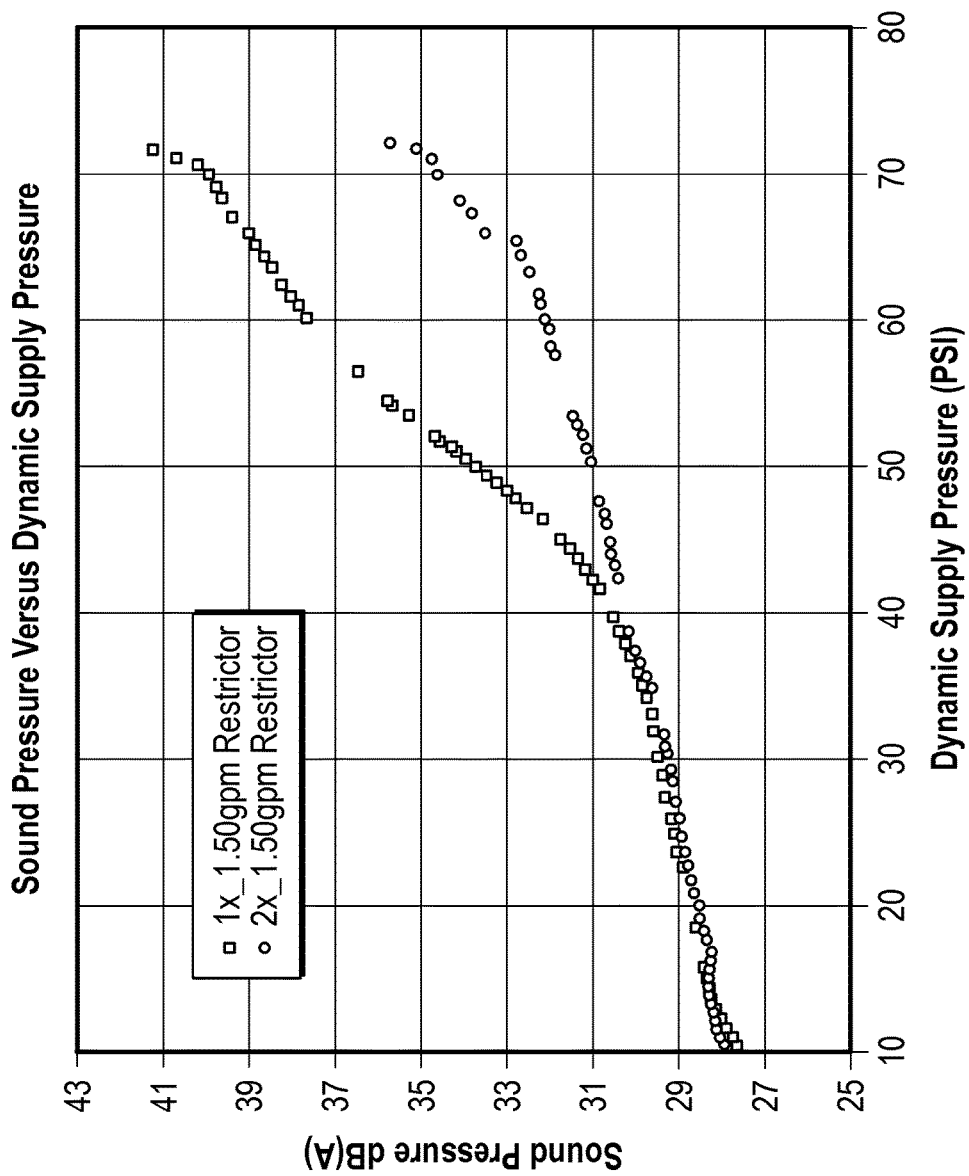
Figure 19:
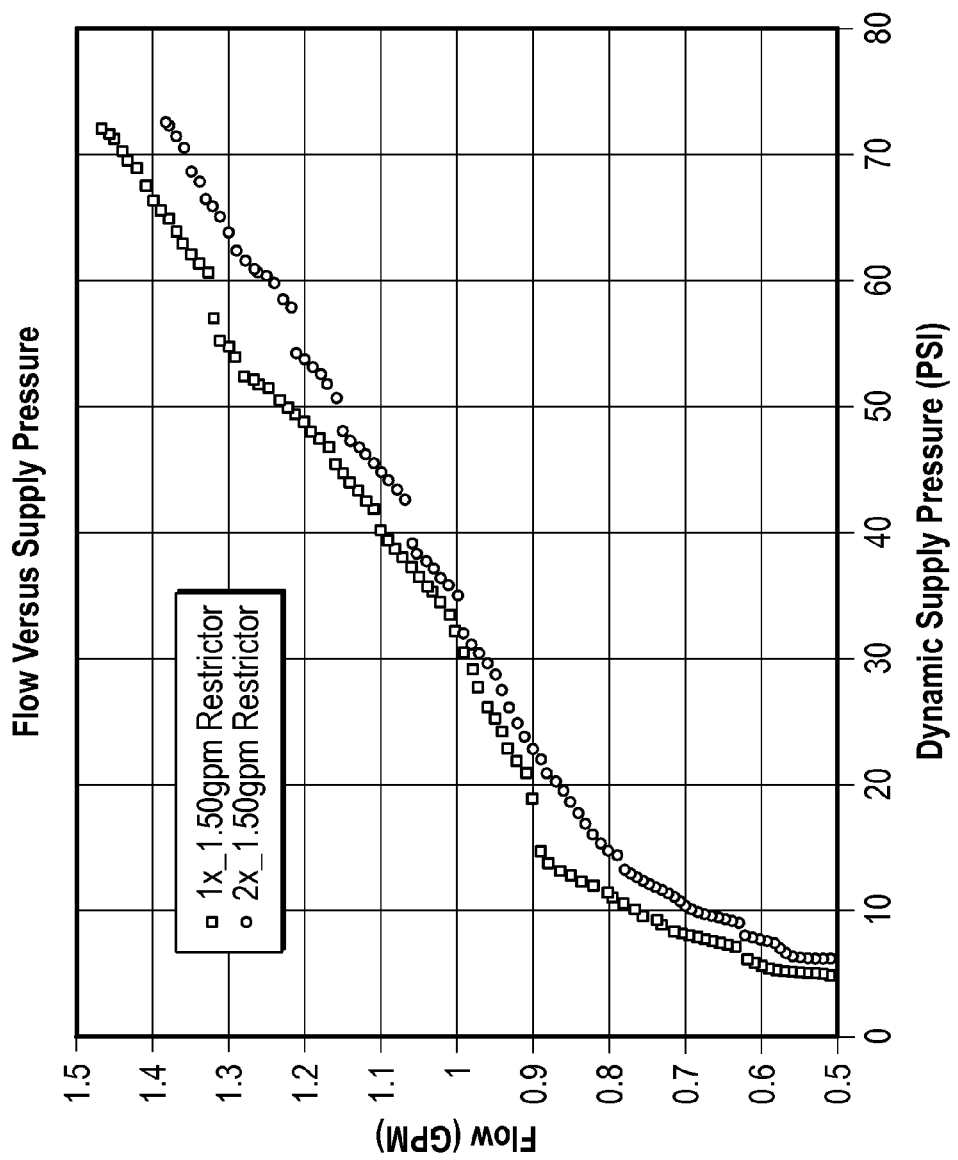

As shown in FIGS. 18 and 19, data is compared for a fill valve 100 having a flow restrictor cartridge 1000 having a compact flow restrictor 800 with a flow rate of 5.678 liters per minute (e.g., 1.5 gallons per minute) to another fill valve having two flow restrictor cartridges 1000 each having a compact flow restrictor 800 with a flow rate of 5.678 liters per minute (e.g., 1.5 gallons per minute). As seen, the fill valve 100 having two flow restrictor cartridges 1000 produces dramatically less noise at higher dynamic supply pressures while only producing a marginal decrease in flow.

Figure 20:
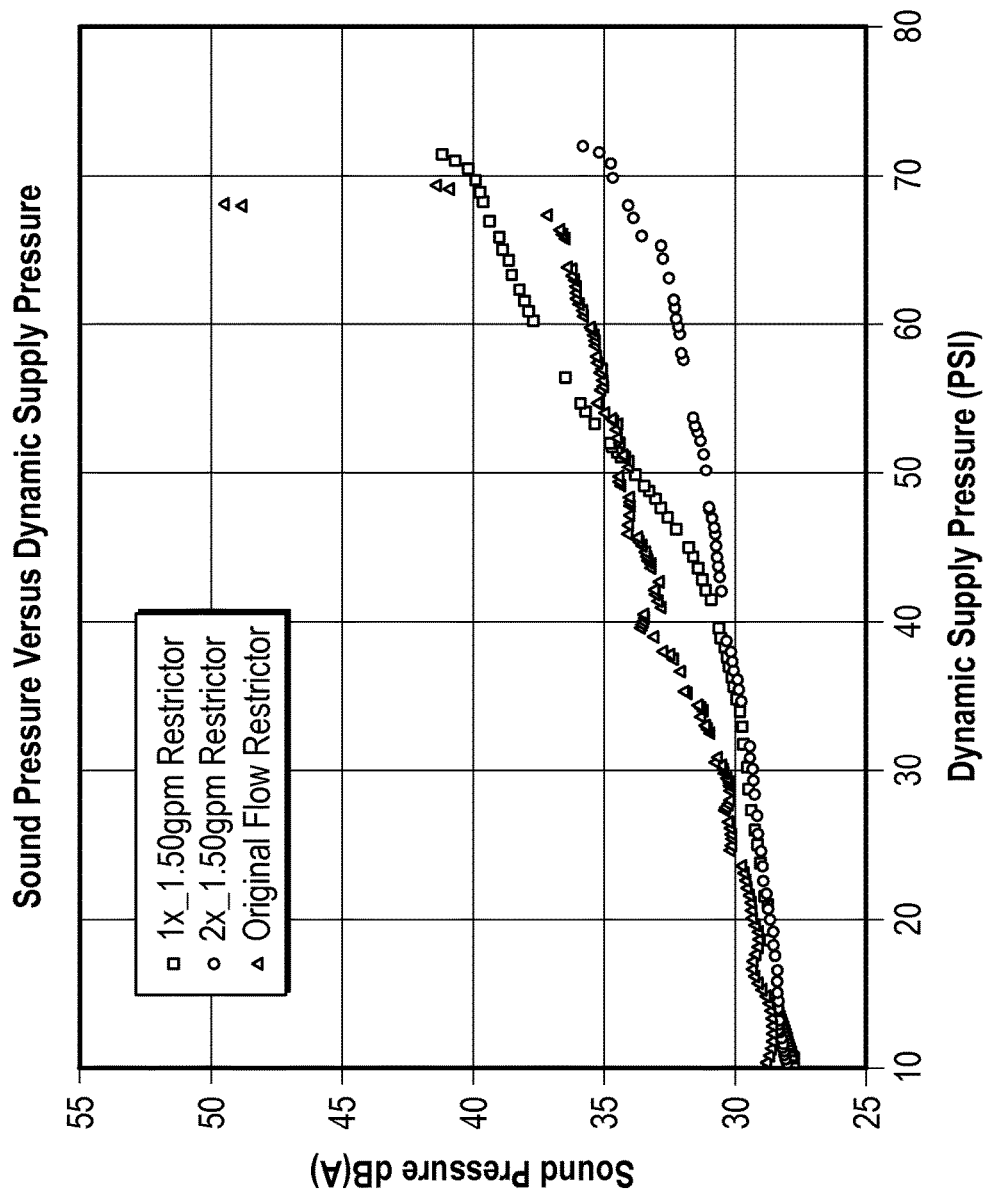
Figure 21:
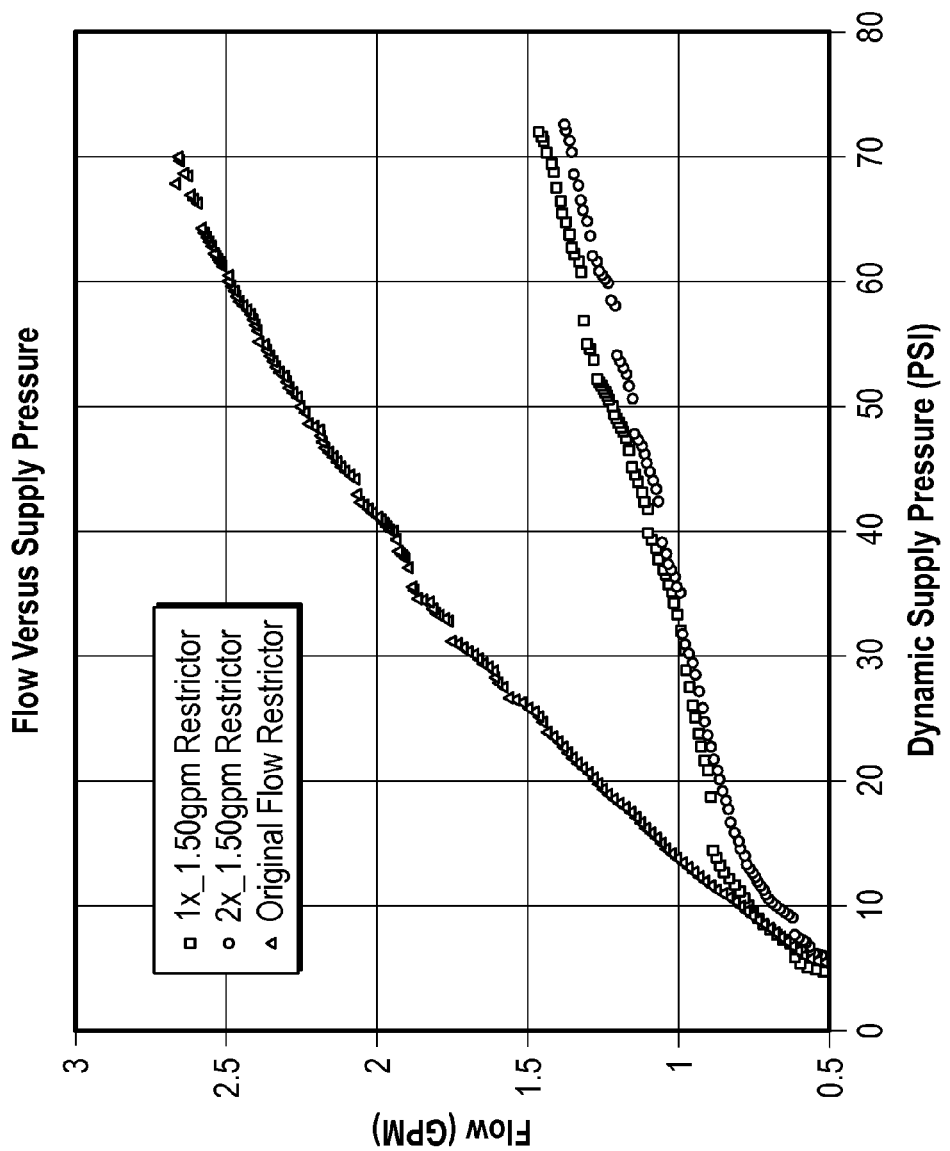

FIGS. 20 and 21 illustrate comparisons between a fill valve 100 having conventional flow restrictor 200, another fill valve 100 having a flow restrictor cartridge 1000 having a compact flow restrictor 800 with a flow rate of 5.678 liters per minute (e.g., 1.5 gallons per minute), and another fill valve having two flow restrictor cartridges 1000 each having a compact flow restrictor 800 with a flow rate of 5.678 liters per minute (e.g., 1.5 gallons per minute). As can be clearly seen, the fill valve 100 having two flow restrictor cartridges 1000 produces dramatically less noise at virtually dynamic supply pressures while only producing a marginal decrease in flow compared to the fill valve 100 having one flow restrictor cartridge 1000.

Figure 22:
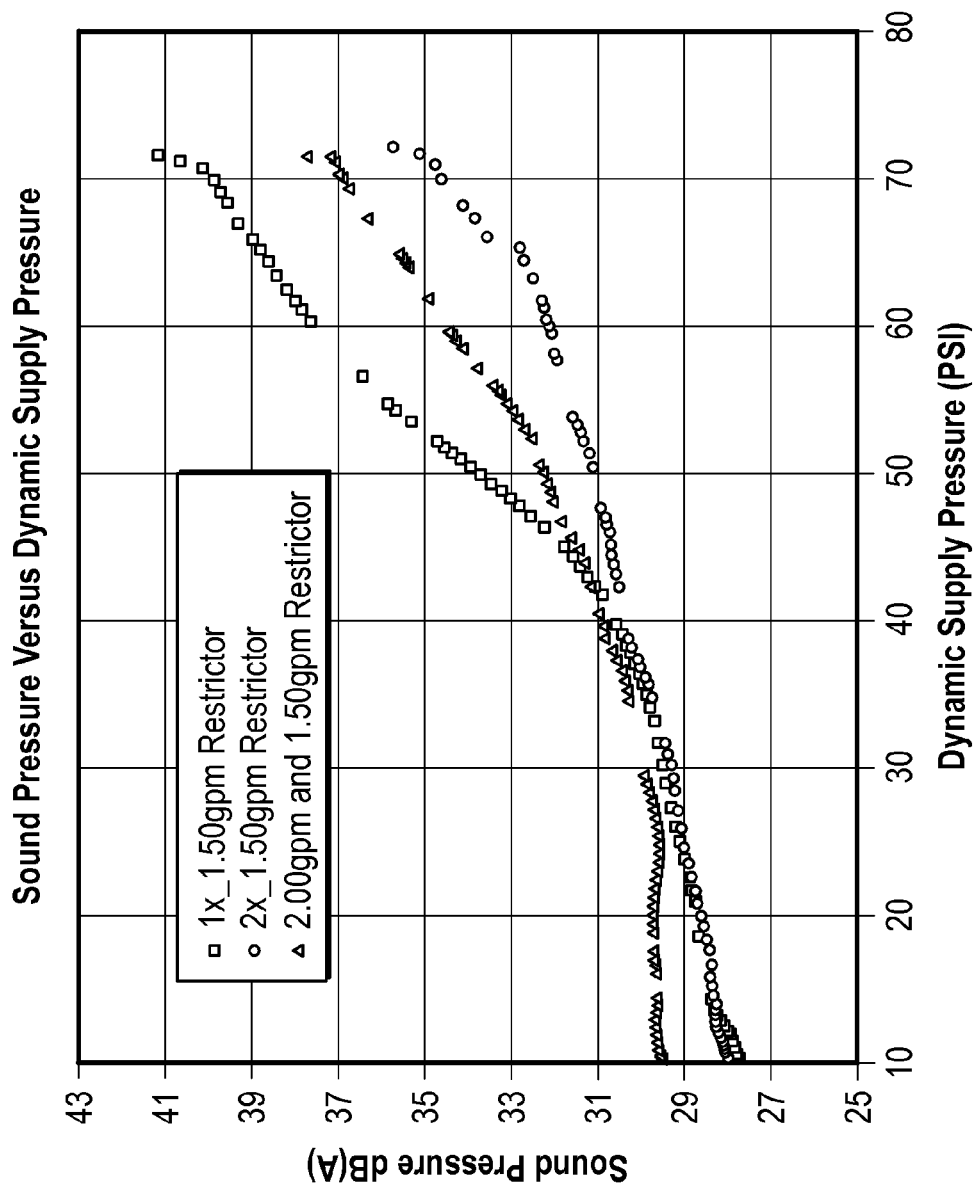
Figure 23:
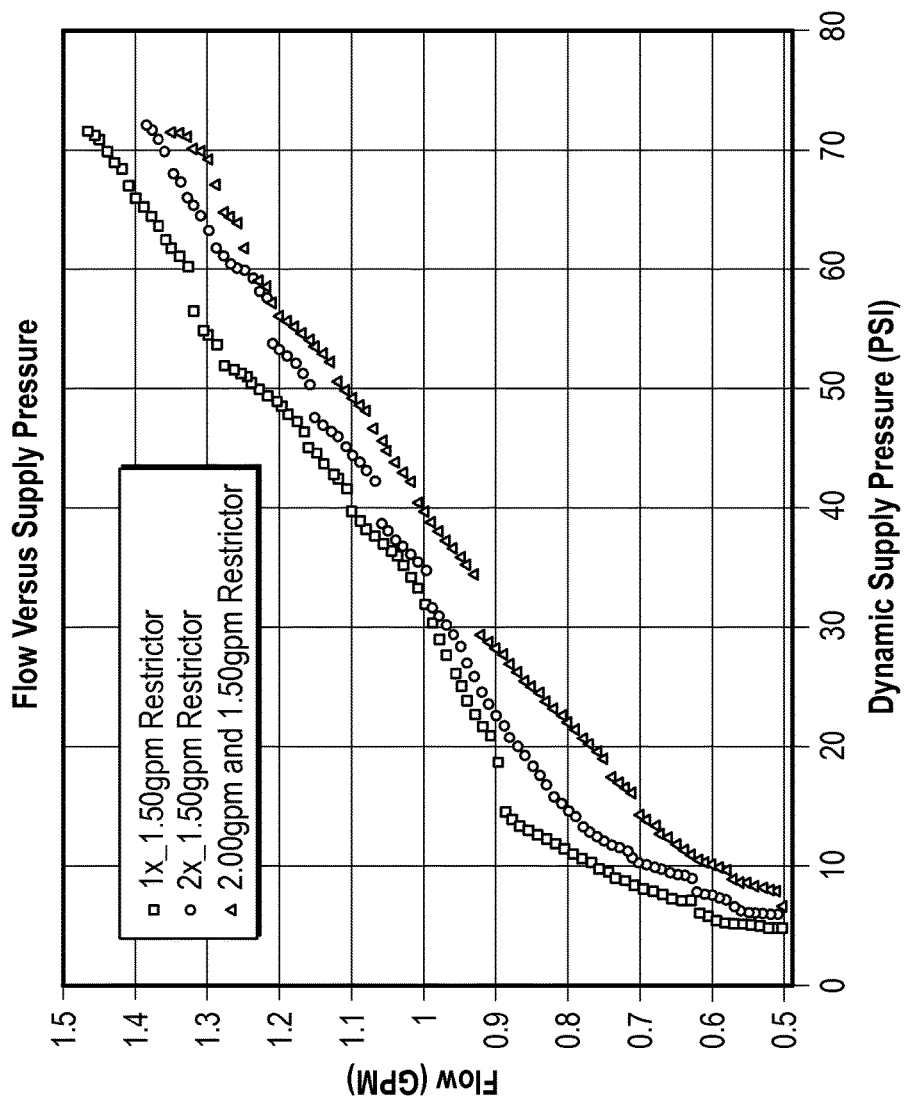

FIGS. 22 and 23 illustrate comparisons between a fill valve 100 having a flow restrictor cartridge 1000 having a compact flow restrictor 800 with a flow rate of 5.678 liters per minute (e.g., 1.5 gallons per minute), another fill valve having two flow restrictor cartridges 1000 each having a compact flow restrictor 800 with a flow rate of 5.678 liters per minute (e.g., 1.5 gallons per minute), and another fill valve having two flow restrictor cartridges 1000 one having a compact flow restrictor 800 with a flow rate of 5.678 liters per minute (e.g., 1.5 gallons per minute) and another having a compact flow restrictor with a flow rate of 7.571 liters per minute (e.g., 2.0 gallons per minute). As can be seen, the combination of different compact flow restrictors 800 did not reduce sound pressures but did reduce flow rates over virtually all supply pressures.

To reduce refill noise, it is also important to reduce flow rate to a suitable level. By reducing flow rate, as is shown in FIGS. 16-23, noise from water splashing may be reduced or eliminated. According to various embodiments, flow restrictor cartridge 1000 provides a decrease in noise due to a decrease in flow rate of fluid after exiting flow restrictor cartridge 1000.

While the above flow restrictor cartridge 1000 has been described with regard to the incorporation of fill valve 100, it is understood that flow restrictor cartridge 1000 could be utilized in a variety of valves, plumbing, and hydraulic systems. For example, flow restrictor cartridge 1000 may be utilized in shower heads, faucets, spray handles, spas, toilets, hot tubs, tubs, steam generators, pressure washers, sinks, mono-block lavatory faucets, bridge style kitchen faucets, bathfill faucets, and other similar systems and devices.

In some embodiments, a screen is incorporated into flow restrictor cartridge 1000. The screen may be placed prior to (relative to the direction of fluid flow) compact flow restrictor 800. The screen may prevent random particles (e.g., debris, contaminants, etc.) from entering and fouling compact flow restrictor 800.

In various embodiments, compact flow restrictors 800 are NeoPerl® flow restrictors. However, it is noted that other types, brands, or configurations of flow restrictors could similarly be used. Accordingly, all of the description herein of compact flow restrictors 800 similarly applies to all other suitable flow restrictors such that flow restrictor cartridge 1000 and fill valve 100 may be tailored for a target application.

Conventional flow restrictor 200 may have a flow rate of, for example, 9.463 liters per minute (e.g., 2.5 gallons per minute) or 10.599 liters per minute (e.g., 2.8 gallons per minute). It some alternative embodiments, flow restrictor cartridge 1000 is adapted to receive conventional flow restrictor 200. In these embodiments, conventional flow restrictor 200 can be lengthened.

Flow restrictor cartridge 1000 may be constructed of various materials such as brass, aluminum, polymeric material, thermoset, polymeric based blend, polymer, nylon, rubber, synthetic rubber, polyvinyl chloride, polytetrafluoroethylene, ceramic, ceramic blend, ceramic-metallic blend, alumina, metallic blend, zinc, alloy, brass, aluminum, steel, or any other suitable material, such that flow restrictor cartridge 1000 may be tailored for a target application.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments and that such variations are intended to be encompassed by the present disclosure.

While flow restrictor cartridge 1000 and compact flow restrictor 800 have been referenced to control a supply of fluid, it is understood that water or other similar fluids could be controlled through the use of flow restrictor cartridge 1000 and compact flow restrictor 800.

The construction and arrangement of the elements of the flow restrictor cartridge and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any element (e.g., flow restrictor, compact flow restrictor, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the appended claims.

What is claimed is:

1. A fill valve for receiving a fluid flow, the fill valve comprising:
   a lower pipe comprising an interior region having a first length; and
   a flow restrictor cartridge that is entirely received within the interior region and having a second length less than the first length, the flow restrictor cartridge receiving the fluid flow at a first fluid flow rate and providing the fluid flow at a second fluid flow rate lower than the first fluid flow rate, the flow restrictor cartridge comprising:
      a body defining a receiver having a first diameter and a central passage having a second diameter less than the first diameter; and
      a compact flow restrictor that is received within the receiver and that interfaces with the receiver, the compact flow restrictor configured to facilitate the reduction from the first fluid flow rate to the second fluid flow rate;
   wherein the interior region has a third diameter that is constant along the first length.

2. The fill valve of claim 1, further comprising a flange;
   wherein the flange defines a stop within the lower pipe, the stop being annulus shaped; and
   wherein movement of the flow restrictor cartridge within the lower pipe is limited by the stop.

3. The fill valve of claim 1,
   wherein the flow restrictor cartridge is cylindrical and defined by a fourth diameter;
   wherein a difference between the fourth diameter and the third diameter facilitates movement of the flow restrictor cartridge within the lower pipe; and
   wherein the flow restrictor cartridge and the lower pipe cooperate to substantially prevent the fluid flow from circumventing the flow restrictor cartridge.

4. The fill valve of claim 1, wherein the flow restrictor cartridge further comprises a second stop defining an internal boundary of the receiver, the second stop being annulus shaped; and
   wherein insertion of the compact flow restrictor within the receiver is limited by the second stop.

5. The fill valve of claim 4, wherein the flow restrictor cartridge further comprises a second compact flow restrictor that cooperates with the compact flow restrictor to facilitate the reduction from the first fluid flow rate to the second fluid flow rate.

6. The fill valve of claim 5, wherein the flow restrictor cartridge further comprises a second receiver opposite the receiver, the second receiver configured to receive the second compact flow restrictor such that insertion of the second compact flow restrictor is limited by the second stop.

7. The fill valve of claim 1, further comprising a second flow restrictor cartridge, the second flow restrictor cartridge received in the interior region in series with the flow restrictor cartridge, the second flow restrictor cartridge receiving the fluid flow from the flow restrictor cartridge and configured to cooperate with the flow restrictor cartridge to facilitate the reduction from the first fluid flow rate to the second fluid flow rate, the second flow restrictor cartridge comprising a third compact flow restrictor that is configured to cooperate with the compact flow restrictor to facilitate the reduction from the first fluid flow rate to the second fluid flow rate.

8. The fill valve of claim 7,
   wherein the second flow restrictor cartridge is cylindrical and defined by a fourth diameter;

wherein a difference between the fourth diameter and the third diameter facilitates movement of the second flow restrictor cartridge within the lower pipe; and wherein the second flow restrictor cartridge and the lower pipe cooperate to substantially prevent the fluid flow from circumventing the second flow restrictor cartridge.

9. The fill valve of claim 8, wherein the flow restrictor cartridge further comprises a second compact flow restrictor that cooperates with the compact flow restrictor to facilitate the reduction from the first fluid flow rate to the second fluid flow rate.

10. The fill valve of claim 9, wherein the second flow restrictor cartridge further comprises a fourth compact flow restrictor that cooperates with the second compact flow restrictor to facilitate the reduction from the first fluid flow rate to the second fluid flow rate.

11. A flow restrictor cartridge for use within a fill valve, the flow restrictor cartridge comprising:
a hollow cylindrical body entirely received within a pipe of the fill valve, the hollow cylindrical body having a first end and an opposing second end, the hollow cylindrical body receiving a flow of fluid at one of the first end and the second end from a fluid source, the hollow cylindrical body providing the flow of fluid from the other of the first end and the second end;
a receiver located within the hollow cylindrical body and extending to the first end;
a stop defining a boundary of the receiver within the hollow cylindrical body, the stop being an annulus disposed along a plane that is parallel to the first end; and
a compact flow restrictor configured to be received within the receiver and to interface with the receiver and the stop, the compact flow restrictor defined by a first flow rate reduction and configured to reduce a flow rate of the flow of fluid from a source flow rate to a target flow rate;
wherein the first end is defined by a first diameter; and
wherein the second end is defined by a second diameter equal to the first diameter.

12. The flow restrictor cartridge of claim 11, wherein the receiver includes a beveled edge contiguous with the first end; and
wherein the beveled edge interfaces with a portion of the compact flow restrictor.

13. The flow restrictor cartridge of claim 11, further comprising a second compact flow restrictor defined by a second flow rate reduction and configured to cooperate with the compact flow restrictor to reduce the flow rate of the flow of fluid from the source flow rate to the target flow rate.

14. The flow restrictor cartridge of claim 13, further comprising a second receiver located within the hollow cylindrical body and extending to the second end;
wherein the second compact flow restrictor is configured to be received by the second receiver.

15. The flow restrictor cartridge of claim 14, wherein the hollow cylindrical body is defined by a first diameter;
wherein the pipe of the fill valve is defined by a second diameter;

wherein a difference between the second diameter and the first diameter facilitates movement of the flow restrictor cartridge within the pipe; and wherein the flow restrictor cartridge and the pipe cooperate to substantially prevent the flow of fluid from flowing between the flow restrictor cartridge and the pipe.

16. A fill valve for receiving a fluid flow, the fill valve comprising:
a lower pipe comprising an interior region having a first length; and
a plurality of flow restrictor cartridges that are individually entirely received within the interior region, each of the plurality of flow restrictor cartridges receiving the fluid flow from one of a fluid source and one of the others of the plurality of flow restrictor cartridges, each of the plurality of flow restrictor cartridges providing the fluid flow to one of an outlet and one of the others of the plurality of flow restrictor cartridges, the plurality of flow restrictor cartridges configured to cooperate to reduce a flow rate of the fluid flow from a source fluid flow rate to a target fluid flow rate, at least one of the plurality of flow restrictor cartridges having a second length less than the first length;
wherein at least one of the plurality of flow restrictor cartridges comprises:
a body defining a receiver having a first diameter and a central passage having a second diameter less than the first diameter; and
a compact flow restrictor that is received within the receiver and that interfaces with the receiver; and
wherein the interior region has a third diameter that is constant along the first length.

17. The fill valve of claim 16,
wherein each the plurality of flow restrictor cartridges is cylindrical and defined by a fourth diameter;
wherein a difference between the fourth diameter and the third diameter facilitates movement of each of the plurality of flow restrictor cartridges within the lower pipe; and
wherein each of the plurality of flow restrictor cartridges and the lower pipe cooperate to substantially prevent the fluid flow from circumventing each of the plurality of flow restrictor cartridges.

18. The fill valve of claim 16, wherein:
each of the plurality of flow restrictor cartridges comprises the compact flow restrictor;
each of the compact flow restrictors is configured to facilitate the reduction from the source fluid flow rate to the target fluid flow rate.

19. The fill valve of claim 18, wherein the reduction from the source fluid flow rate to the target fluid flow rate occurs gradually by using each of the compact flow restrictors to step down from the source fluid flow rate to the target fluid flow rate.

20. The fill valve of claim 18, wherein at least one of the plurality of flow restrictor cartridges comprises two of the compact flow restrictors.

* * * * *